United States Patent
Schroeder

(10) Patent No.: US 8,028,594 B2
(45) Date of Patent: Oct. 4, 2011

(54) NUT WITH FLEXIBLE GRIPPING FINGERS AND APPARATUS

(75) Inventor: Jonathan R. Schroeder, Roscoe, IL (US)

(73) Assignee: Pacific Bearing Company, Rockford, IL (US)

( * ) Notice: Subject to any disclaimer, the term of this patent is extended or adjusted under 35 U.S.C. 154(b) by 986 days.

(21) Appl. No.: 11/943,921

(22) Filed: Nov. 21, 2007

(65) Prior Publication Data
US 2009/0126521 A1 May 21, 2009

(51) Int. Cl.
*F16H 25/22* (2006.01)
(52) U.S. Cl. .................... 74/89.42; 74/424.95
(58) Field of Classification Search ............. 74/89.42, 74/424.71, 424.78, 424.94, 424.95, 424.96
See application file for complete search history.

(56) References Cited

U.S. PATENT DOCUMENTS

| | | | |
|---|---|---|---|
| 3,713,932 A * | 1/1973 | Butzow et al. ............ 156/173 |
| 4,131,031 A | 12/1978 | Erikson et al. | |
| 4,210,033 A | 7/1980 | Erikson et al. | |
| 4,249,426 A | 2/1981 | Erikson et al. | |
| 4,274,294 A * | 6/1981 | Siryj et al. ............. 74/424.95 |
| 4,282,764 A * | 8/1981 | Harris ..................... 74/424.75 |
| RE32,433 E | 6/1987 | Erikson et al. | |
| 5,027,671 A | 7/1991 | Erikson et al. | |
| 5,601,372 A | 2/1997 | Erikson et al. | |
| 5,732,596 A | 3/1998 | Erikson et al. | |
| 5,913,940 A | 6/1999 | Erikson et al. | |
| 5,913,941 A | 6/1999 | Erikson et al. | |
| 5,937,702 A | 8/1999 | Erikson et al. | |
| 6,041,671 A | 3/2000 | Erikson et al. | |
| 6,099,166 A | 8/2000 | Erikson et al. | |
| 6,117,249 A | 9/2000 | Erikson et al. | |
| 6,131,478 A | 10/2000 | Erikson et al. | |
| 6,202,500 B1 | 3/2001 | Erikson et al. | |
| 6,240,798 B1 | 6/2001 | Erikson et al. | |
| 6,415,673 B1 | 7/2002 | Erikson et al. | |
| 6,422,101 B2 | 7/2002 | Erikson et al. | |
| 6,467,362 B2 | 10/2002 | Erikson et al. | |
| 7,219,570 B2 | 5/2007 | Erikson et al. | |

FOREIGN PATENT DOCUMENTS

| | | |
|---|---|---|
| GB | 2 408 301 A | 5/2005 |
| JP | 61-228157 A | 10/1986 |
| JP | 2001-221313 A | 8/2001 |
| JP | 2001-280440 A | 10/2001 |
| JP | 2003-240098 A | 8/2003 |
| WO | WO 2006/106817 A1 | 10/2006 |

* cited by examiner

*Primary Examiner* — William C Joyce
(74) *Attorney, Agent, or Firm* — Reinhart Boerner Van Deuren P.C.

(57) ABSTRACT

A nut and lead screw assembly that includes a nut are provided. The nut includes at least one flexible finger for adjusting the engagement of a threaded portion of the nut with corresponding threads of a lead screw. The threaded portion is preferably formed of a different material than the flexible finger. The material of the threaded portion is preferably of a lower coefficient of friction than the flexible finger. The nut also includes an adjustment mechanism that adjust the radial position of the flexible finger and also the threaded portion. A preferred adjustment mechanism includes a spring finger that provides a radially extending biasing load to a free end of the flexible finger to adjust the position of the flexible finger. The adjustment mechanism more preferably includes a an adjustment member that adjusts the radial load provided by the spring finger.

15 Claims, 5 Drawing Sheets

NUT WITH FLEXIBLE GRIPPING FINGERS AND APPARATUS

FIELD OF THE INVENTION

This invention generally relates to lead screw assemblies and more particularly to nuts for lead screw assemblies and even more particularly to nuts for lead screw assemblies that include flexible fingers and low friction threads as well as lead screw assemblies that include nuts with flexible fingers.

BACKGROUND OF THE INVENTION

Lead screw assemblies are well known devices for linearly actuating devices. A lead screw assembly uses rotational motion of a lead screw to linearly actuate a nut having internal threads that engage the external threads of the lead screw. Rotation of the screw in a first rotational direction actuates the nut in a first linear direction along the axis of the screw and reversing rotation of the screw to a second rotational direction actuates the nut in a second linear direction, opposite the first linear direction, along the axis of the screw. As such, the nut is mounted for rectilinear motion along the lead screw.

Prior lead screw assemblies are known, for example, U.S. Pat. Nos. 5,913,940 to Erikson et al. and RE 32,433 to Erikson et al. illustrate lead screw assemblies that include nuts that have flexible fingers to permit adjustment or predetermined biasing of the threads of the nut towards and against the threads of the lead screw.

The present invention is directed toward improvements in relation to the lead screw and nut interaction of lead screw assemblies.

BRIEF SUMMARY OF THE INVENTION

The present invention has several aspects that may be claimed and stand as patentable individually or in combination including but not limited to the following.

In one aspect, the invention provides a nut for a lead screw assembly in which the nut in which a threaded portion of the nut provides for reduced friction. The nut includes a base, at least one flexible finger, an adjustment mechanism and an internally threaded portion. The at least one flexible finger is formed of a first material. The flexible finger is joined to the base and extends axially from the base between a fixed end joined to the base and a free end. The adjustment mechanism is configured to radially flex the at least one flexible finger. The internally threaded portion is fixed to the at least one flexible finger proximate the free end. The threaded portion being formed of a second material that is different than the first material.

According to a preferred arrangement of embodiments of this first aspect, the nut includes a plurality of flexible fingers. In another preferred arrangement, the second material that forms the threaded portion has a lower coefficient of friction than the first material that forms the flexible fingers. In an even more preferred arrangement, the first material includes any of the following materials: polytetrafluoroethylene, perfluoroalkoxy and fluorinated ethylene propylene and the second material is structural plastic including any one of polycarbonates, nylons and acetal plastics. However, these materials might be used in other parts of the nut as well.

In another aspect, an embodiment provides a nut which is configured for rectilinear movement along a lead screw that includes spring fingers for generally adjusting the radial position of a threaded portion of the nut. The nut includes a base, a flexible finger, and an adjustment mechanism that includes the spring finger. The flexible finger extends axially from a portion of the base between a fixed end joined to the base and a free end. The adjustment mechanism includes a spring finger and an adjustment member. The spring finger corresponds to the flexible finger and extends axially between a mounting end and a biasing end. The mounting end is fixed proximate the fixed end of the flexible finger. The biasing end abuts the flexible finger proximate the free end. A radial gap is formed between the flexible finger and the spring finger, at least when the spring finger is in a relaxed state. The adjustment member radially inwardly biases the spring finger against the corresponding flexible finger such that the spring finger provides a radial biasing load to the corresponding flexible finger.

According to this aspect, the nut may include a plurality of flexible fingers, with each flexible finger having a corresponding spring finger for radially biasing the flexible fingers. Further, the flexible fingers may include a longitudinal extending spring finger locating slot to prevent angular rotation of the spring finger relative to the flexible finger. Further, the spring finger may be secured to the flexible finger by interaction of a catch and aperture arrangement to prevent axial movement of the spring finger relative to the flexible finger. The spring finger may further include a channel that engages a rib formed proximate the free end of the flexible finger. Further yet, the biasing member is preferably internally threaded and can be infinitely positioned between a start point and an end point to adjust the radial biasing of the flexible fingers by the spring fingers.

In yet another aspect, an embodiment provides an apparatus that provides for improved engagement of a nut that rectilinearly moves along a lead screw to provide increased fluidity in movement and more accurate positioning. The apparatus includes a nut that includes a support region of a first plastic material and a threaded region formed of a second plastic material joined to the support region.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
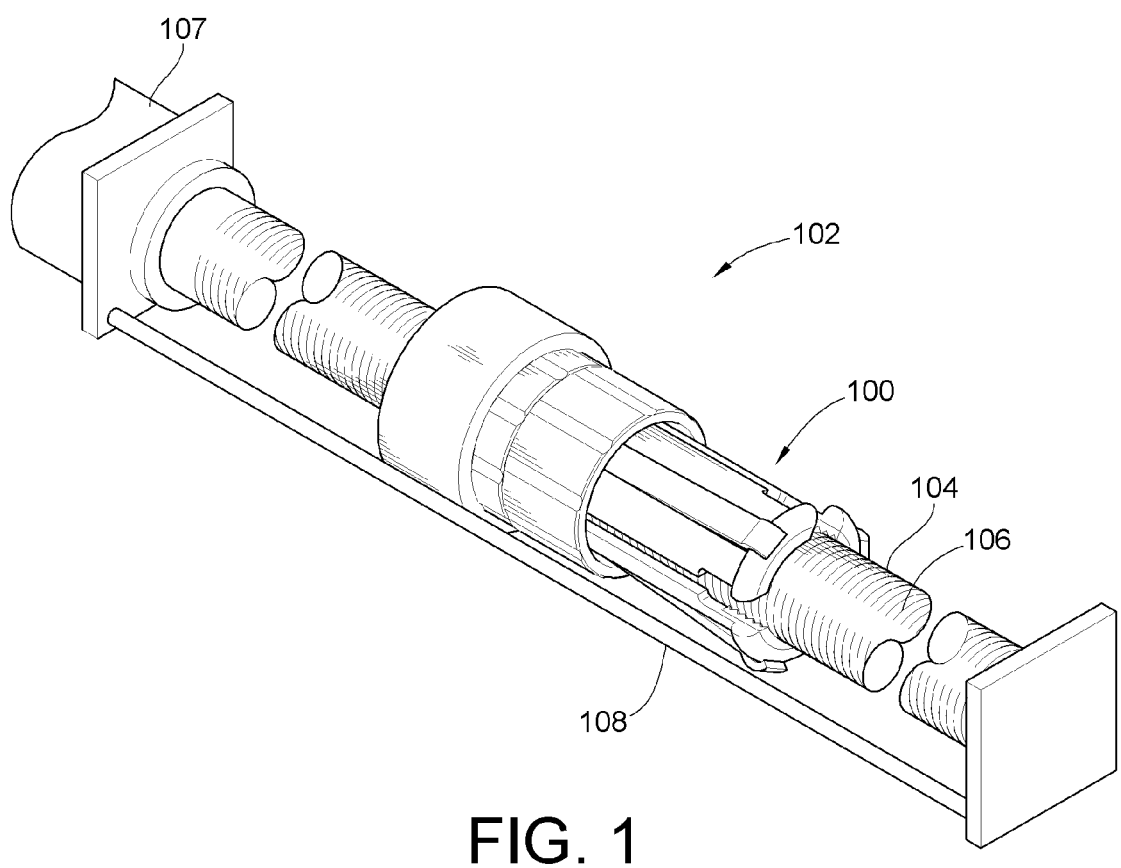
FIG. 1 is a perspective view of a first embodiment of a lead screw assembly according to the teachings of the present invention.
Figure 2:
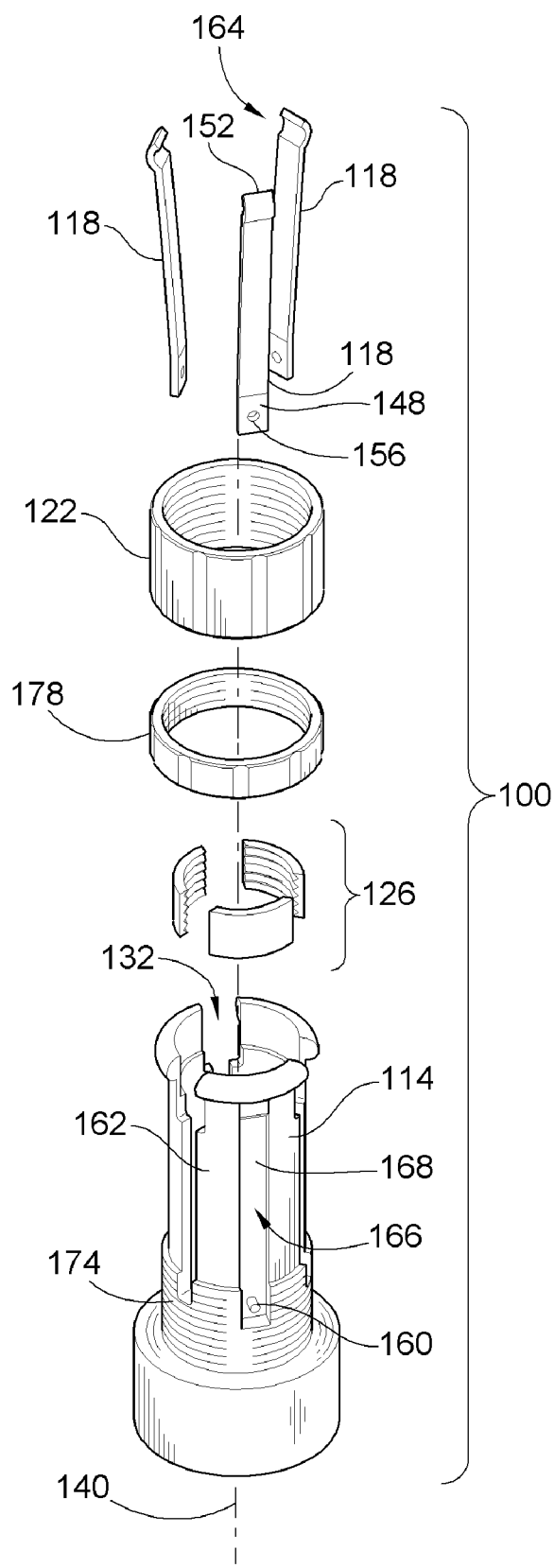
FIG. 2 is a perspective exploded view of the nut of the lead screw assembly of FIG. 1.
Figure 3:
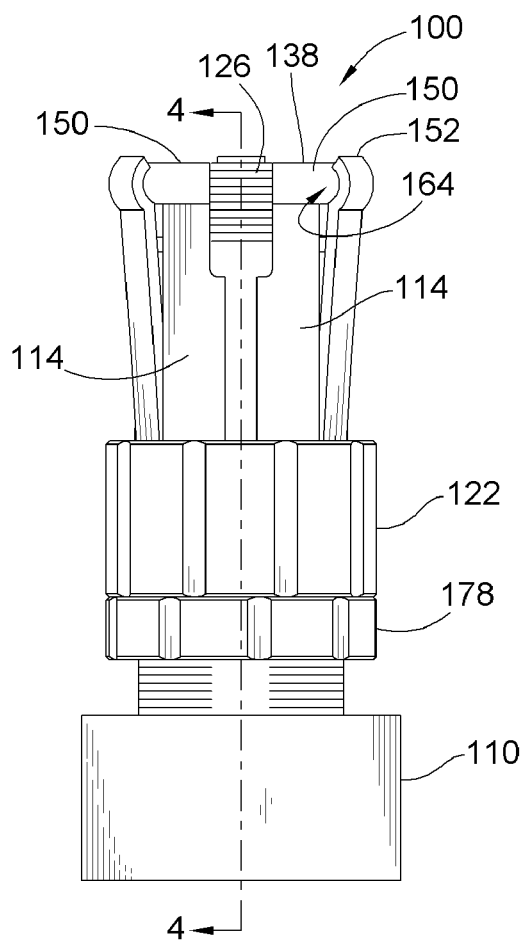
FIG. 3 is a profile assembled view of the nut of FIG. 2.

FIG. 1 illustrates a lead screw assembly 102 including a nut 100 installed on an externally threaded lead screw 104. The nut 100 engages external threads 106 of the screw and converts rotational movement of the screw 104 into linear motion along the longitudinal axis of the screw 104 about which the screw 104 rotates. The screw 104 is operably coupled to a motor 107 to drive the screw in both clockwise and counter-clockwise rotation such that the nut 100 can move linearly both forward and backward along the longitudinal axis of the screw 104 as desired by the operator.

To prevent rotation of the nut 100 and facilitate linear motion of the nut 100 as the screw 104 rotates, the nut 100 operably interacts with an anti-rotation device illustrated in the form of guide rails 108. By preventing the nut 100 from rotating with the screw 104, the guide rails 108 facilitate conversion of the rotational motion of the screw 104 into linear motion of the nut 100 as is known in the art. In the illustrated embodiment, the nut 100 includes slots (not shown) in which the guide rails 108 are received and that interaction provides a torque to the nut 100 in the direction opposite the direction of rotation of screw 104.

While the nut 100 is illustrated as directly engaging guide rails 108 to prevent rotation of the nut 100, the nut 100 could alternatively be prevented from rotating via the device to which the nut 100 is connected. For example, a device could be separately mounted for linear movement and the nut could be coupled to the device with the axis of the longitudinal screw 104 parallel to the axis of motion for the device. Here, the device itself is the anti-rotation device and acts to prevent rotation of the nut 100 as the screw 104 rotates.

Depending on the attached device, it may be desired to provide either accurate positioning and/or fluid motion of the nut 100 along the screw 104. Embodiments of nuts of the present invention described below are designed to provide improved engagement and interaction between the nut and screw to provide for the improved positioning and/or more fluid motion of the nut along the screw.

FIGS. 2-5 more clearly illustrate an embodiment of a nut 100 according to the teachings of the present invention. With reference to the exploded illustration of FIG. 2, nut 100 includes a base in the form of annular base 110, a plurality of flexible fingers 114, an adjustment mechanism that includes a plurality of spring fingers 118 and a biasing member in the form of annular adjustment collar 122, and a threaded portion 126. As will be more fully understood, the base 110 and flexible fingers 114 form a support region to which the threaded portion 126 is joined the threaded portion 126 may also be referred to as a threaded region.

Figure 4:
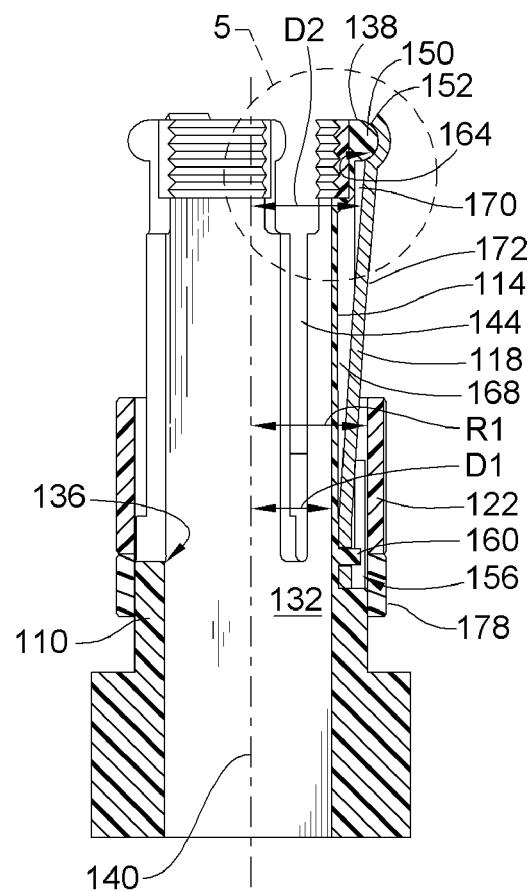
FIG. 4 is a cross-sectional illustration of nut of FIG. 3, taken about line 4-4.
Figure 5:
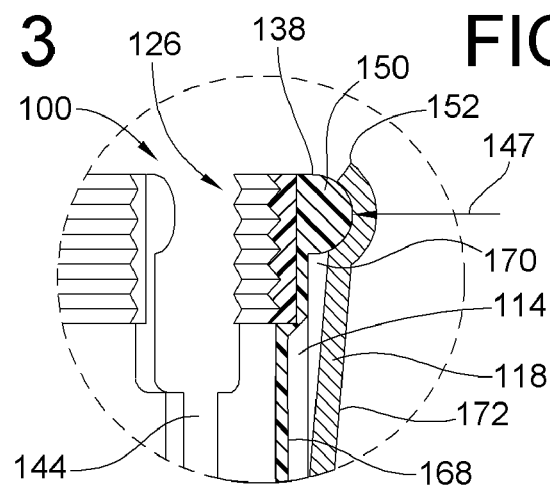
FIG. 5 is an enlarged partial illustration of the threaded portion of the nut taken about line 5-5.
Figure 6:
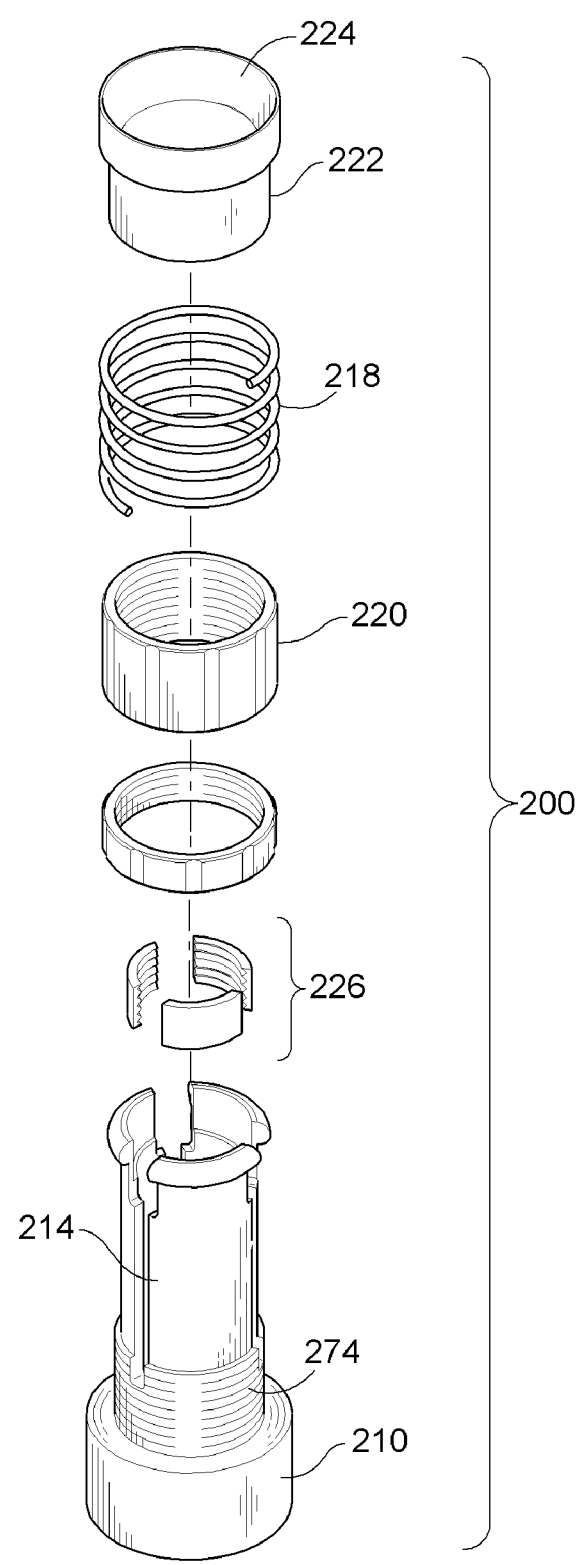
FIG. 6 is a perspective exploded view of a second embodiment of a nut according to the teachings of the present invention.
Figure 7:
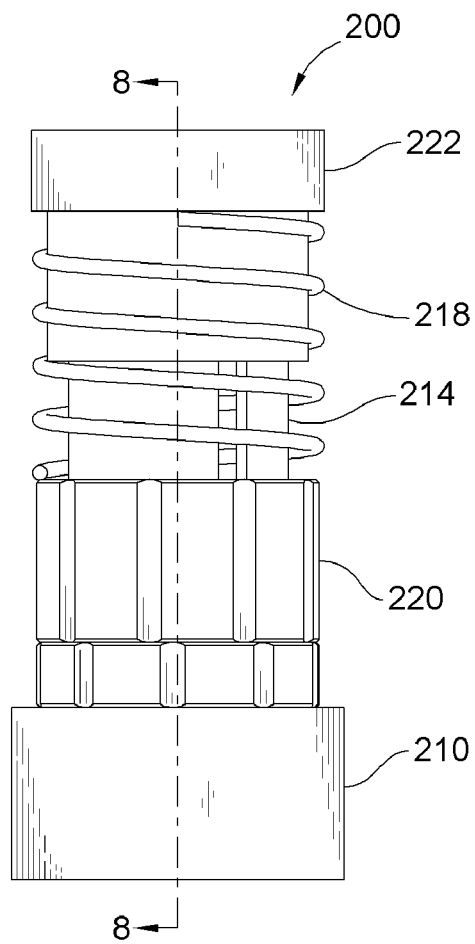
FIG. 7 is a profile view of the nut of FIG. 6.
Figure 8:
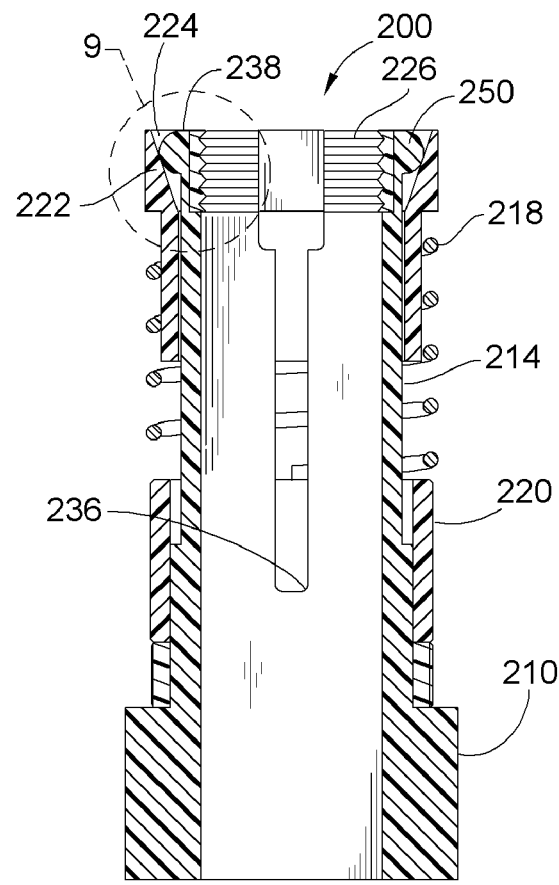
FIG. 8 is a cross-sectional illustration of nut of FIG. 7, taken about cut line 8-8.
Figure 9:
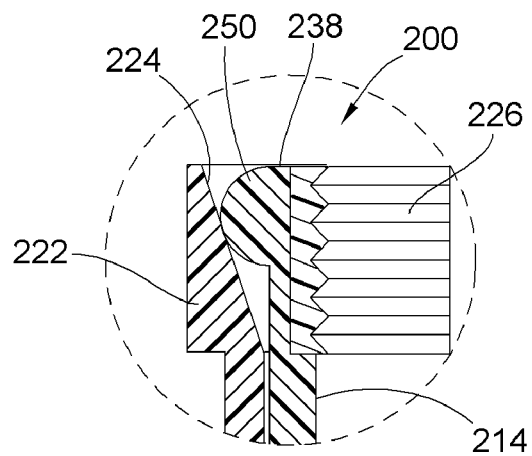
FIG. 9 is an enlarged partial illustration of the threaded portion of the nut of FIG. 8 taken about line 9-9.

With further reference to FIG. 4, the base 110, flexible fingers 114 and threaded portion 126 combine to define a longitudinally extending central channel 132 through which the screw 104 upon which the nut 100 rides is received (see generally FIG. 1).

The flexible fingers 114 extend axially from the annular base 110 between a fixed end 136 and a free end 138. The fixed end 136 of each flexible finger 114 connects to the annular base 110 to join the flexible finger 114 to the annular base 110. The base 110 connects the flexible fingers 114 to one another. The flexible fingers 114 surround a portion of the central channel 132 and generally define and surround a central axis 140. Typically, all flexible fingers 114 are equally spaced radially away from the central axis 140 a distance R1.

Adjacent ones of the flexible fingers 114 are angularly separated from one another by an axially extending gap 144. Each gap 144 extends axially the length of the adjacent flexible fingers 114 and facilitates radial flexure of the flexible fingers 114 toward or away from the central axis 140. In particular, the gap 144 provides a relief zone to permit the flexible fingers 114 to flex radially inward without contacting one another such that the flexible fingers 114 does not interfere with the radial flexure of the other finger 114.

The threaded portion 126 is joined to an internal surface 145 of the flexible fingers 114 such that internal threads 146 of the threaded portion 126 can engage the external threads 106 of the screw 104. The threaded portion 126 is positioned proximate the free end 138 of the flexible fingers 114. In the illustrated embodiment, the threaded portion extends axially only a portion of the length of the flexible fingers 114. However, alternatively, the threaded portion 126 could extend the entire length of the flexible fingers 114 or even beyond the flexible fingers 114 such that the threads 146 extend the entire length of the nut 100.

Preferably the base 110, flexible fingers 114 and threaded portion 126 are formed of plastic material. In the illustrated embodiment, the threaded portion 126 is formed of a different plastic material than the support region of the nut 100, i.e. the flexible fingers 114 and base 110. Further, in one embodiment, the threaded portion 126 is formed of a material that has a lower coefficient of friction than the material of the flexible fingers 114 and base 110. The threaded portion 126 is preferably a lubricious material. More preferably, the material is or is a combination of polytetrafluoroethylene, perfluoro-alkoxy and fluorinated ethylene propylene. However, other low friction materials may be used to form the threaded portion 126 when practicing the present invention. The lubricious and low friction material prevents undesired friction between the nut 100 and screw 104 to provide for improved fluidity in the movement of the nut 100 along screw 104.

The base 110 and flexible fingers 114 are preferably formed of a structural material including any one of or any combination of polycarbonate, nylon or acetal plastics. In some embodiments, the support region is flexible, yet has substantial rigidity to prevent unwanted flexure of the nut 100 as it moves along the screw 104. Further, in some embodiments, the material of the support region has a higher rigidity than the material of the threaded region.

The threaded portion 126 may be secured to the base 110 and flexible fingers 114 in numerous ways. The threaded portion 126 may be adhesively or chemically bonded to the base 110 and flexible fingers 114. Alternatively, the threaded portion 126 may be co-molded with the base 110 and flexible fingers 114. Further, the threaded portion could be mechanically fastened to the support region, such as by forming cooperating snaps or interlocks in the flexible fingers 114 and threaded portion 126.

As indicated previously, nut 100 includes an adjustment mechanism that includes a plurality of spring fingers 118 and a biasing member in the form of an annular adjustment collar 122. The adjustment mechanism functions to adjust the radial position of the flexible fingers 114 relative to central axis 140, and more particularly the radial position of threaded portion 126 connected to the flexible fingers 114. The adjustment mechanism provides radial loading, by interaction between the spring fingers 118 and adjustment collar 122, to press the flexible fingers 114 toward central axis 140. As such, the biasing mechanism can be used to adjust the engagement between nut 100 and screw 104.

Each spring finger 118 provides a radially directed load, illustrated as arrow 147, to corresponding flexible finger 114 proximate free end 138. A biasing end portion 152 of the spring finger 118 presses radially inward against a radially outward projecting rib 150 formed on the outer surface 162 of a corresponding flexible finger 114. The biasing end portion 152 of the spring finger 118 of the illustrated embodiment further includes a channel 164 extending generally transverse to the longitudinal length of the spring finger 118 which receives and engages the rib 150 to assist proper alignment of the spring finger 118 relative to the flexible finger 114. The ribs 150 having a generally semi-circular cross-section when viewed angularly about central axis 140.

A mounting end portion 148 of each spring finger 118 connects to the annular base 110 and/or a corresponding flexible finger 114. As illustrated, the mounting end portion 148 includes an aperture 156 that receives a corresponding catch, illustrated in the form of a radially outward extending stake 160. The interaction of the aperture 156 and stake 160 prevents axial movement of the spring finger 118 relative to the flexible finger 114.

The outer surface 162 of each flexible finger 114 further includes a spring finger locating groove 166. The locating groove 166 receives the spring finger 118 and angularly locates the spring finger 118 relative to its corresponding flexible finger 114. The spring finger locating groove 166 extends longitudinally generally parallel to the gaps 144. In the illustrated embodiment, stake 160 engaging the mounting end portion 148 of the spring finger 118 is located within the spring finger locating groove 166 and extends radially outward from the bottom surface 168 of the spring finger locating groove 166.

As illustrated in FIG. 4, the orientation of the spring finger 118 relative to its corresponding biasing finger 114 forms a clearance gap 170 radially between the two components, at least when the spring finger 118 is in a relaxed state. This clearance gap 170 permits radially flexure of the spring finger 118 radially toward central axis 140 to adjust the magnitude of radial load 147, as will be more fully explained below.

With primary reference to FIG. 4, each spring finger 118 is oriented such that the outer surface 172 of the spring finger 118 includes a tapered portion that tapers radially outward when viewed in a direction extending from the mounting end portion 148 toward the biasing end portion 152. More particularly, the portion of the outer surface 172 that is proximate mounting end portion 148 is radially positioned a first distance D1 from the central axis 140 and the portion of the outer surface 172 that is proximate biasing end portion 152 is radially positioned a second distance D2 from the central axis, with distance D2 being greater than distance D1.

Adjustment collar 122 surrounds the spring fingers 118 and presses the spring fingers 118 radially inward against the flexible fingers 114. The adjustment collar 122 is internally threaded such that its axial position relative to the flexible fingers 114, annular base 110 and spring fingers 118 may be adjusted via external threads 174 (see FIG. 2) that surround the base 110 and a portion of the flexible fingers 114. The interaction of the threads allows the adjustment collar to be adjusted from a first position being a first distance from the free ends 138 of the flexible fingers 114 to a second position being a second distance from the free ends 138. The second distance being less than the first distance. The second position can be referred to as being proximate the free end 138, while the first position can be referred to as being proximate the fixed end 136. By using threads, the position of the adjustment collar 122 is continuously adjustable between the first and second positions.

The adjustment collar 122 abuts the tapered portion of the spring fingers 118 to adjust the biasing load 147. Consequently, the internal radius R1 of the adjustment collar 122 is sized such that it is greater than or equal to distance D1 but is less than or equal to distance D2. As the adjustment collar 122 is threaded toward the free end 138 of the flexible fingers 114, the adjustment collar 122 increasingly radially inwardly flexes the spring fingers 118 and reducing the radial size of clearance gap 170. By increasingly flexing the spring fingers 118, the corresponding biasing load 147 of each spring finger 118 is increased. Thus, the operator can adjust the desired magnitude of the biasing load 147 to provide the desired interaction between the threaded portion 126 and the screw 104 with the adjustment collar 122 in the first position, the spring fingers 118 are in a relative relaxed state, when compared to the adjustment collar 122 being in the second position.

By using the flexible spring fingers 118, the spring fingers 118 can flex and correct for minor wear of the threaded portion 126 over a period of use.

A jam nut 178 may be provided to engage against an end of adjustment collar 122, opposite the end that engages the spring fingers 118 to fix the axial position of the adjustment collar 122 relative to the flexible fingers 114 and to prevent loosening or undesired adjustment of the adjustment collar 122.

While nut 100 is illustrated as completely surrounding the lead screw 104, other embodiments of the nut are contemplated. For example, the nut could sit above the lead screw with only a single flexible finger engaging a portion of the threads of the lead screw. As such, the lead screw could be vertically supported from a bottom portion and only have a top portion of the threads exposed or accessible by a nut as it moves rectilinearly along the lead screw. In such a configuration, the flexible finger and threaded portion would only engage that exposed threaded portion of the lead screw. Further, the biasing member would not be an annular collar that fully surrounds the lead screw, but could be a set screw or other device that moves radially inward to radially bias the spring finger(s) of the nut to adjust the radial loading provided by the spring finger(s).

FIGS. 6-9 illustrate a second embodiment of a nut 200 according to teachings of the present invention for use in a lead screw assembly. Nut 200 is similar to nut 100 in many respects and only those significant differences between the two embodiments will be described below.

Nut 200 includes a support region including base 210 and flexible fingers 214. Nut 200 further includes an adjustment mechanism that includes coil spring 218 preload adjusting collar 220 and adjustment collar 222.

In this embodiment, adjustment collar 222 includes an internal radially outwardly tapering biasing ramp 224 that abuts and slidingly rides against ribs 250 of the flexible fingers 214. The coil spring 218 axially biases adjustment collar 222 and, consequently, biasing ramp 224 towards the ribs 250 such that the flexible fingers 214 and more particularly the threaded portion 226 joined to the flexible fingers 214 is biased radially inward.

The coil spring 218 extends between and is compressed between the adjusting collar 220 and adjustment collar 222.

The adjusting collar 220 is internally threaded such that its axial position relative to the flexible fingers 214 and, particularly, ribs 250 can be adjusted. The interaction of the threads of the adjusting collar 220 and external threads 274 of the base 210 and flexible fingers 214 allows the adjusting collar 220 to be adjusted from a first position being a first distance from the free ends 238 of the flexible fingers 214 to a second position being a second distance from the free ends 238. The second distance being less than the first distance. The second position can be referred to as being proximate the free end 238, while the first position can be referred to as being proximate the fixed end 236. By using threads, the position of the adjusting collar 220 is continuously adjustable between the first and second positions.

By varying the axial position of the adjusting collar 220, the amount of axial loading applied to the adjustment collar 222 by coil spring 218 is adjusted. The greater the axial loading applied to the adjustment collar 222, the greater the radial loading that is applied to the flexible fingers 214. As such, the amount of radial flexure of the flexible fingers 218 can be adjusted by adjusting the position of adjusting collar 220 to adjust the amount of compression of the coil spring 218 to adjust the engagement of the threaded portion 226 with a corresponding screw.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A nut for rectilinear movement along lead screw, the nut comprising:
   a base;
   at least one flexible finger formed of a first material, the flexible finger joined to the base and extending axially from the base between a fixed end joined to the base and a free end;
   an adjustment mechanism engageable with the at least one flexible finger for radially flexing the at least one flexible finger; and
   a threaded portion fixed to the at least one flexible finger proximate the free end, the threaded portion being formed of a second material different than the first material;
   wherein the second material is a low friction material selected from the group consisting of: polytetrafluoroethylene, perfluoroalkoxy and fluorinated ethylene propylene;
   wherein the at least one flexible finger includes a plurality of flexible fingers, wherein an axially extending gap separates adjacent flexible fingers, the internally threaded portion extends axially only a portion of the length of the flexible fingers, wherein the threaded portion is formed by a plurality of pieces, wherein the axially extending gap separates adjacent ones of the pieces of the threaded portion;
   wherein the base, flexible fingers and threaded portion define a generally cylindrical channel and the only internal threads surrounding the cylindrical channel are formed by the internally threaded portion; and
   wherein the second material is molded to the first material.

2. The nut of claim 1, wherein the first material is a structural plastic selected from the group consisting of: polycarbonates, nylons and acetal plastics.

3. The nut of claim 1, further including a radially outward extending rib formed on each flexible finger, the adjustment mechanism including:
   an annular adjustment collar surrounding the flexible fingers, an internal surface of the adjustment collar including a biasing ramp extending angularly the entire internal circumference of the adjustment collar, the ramp tapered radially outward when viewed in a direction extending from the fixed end toward the free end, the biasing ramp abutting the biasing ribs and providing a radially inward direct load to the ribs; and
   a coil spring axially biasing the adjustment collar toward the ribs.

4. The nut of claim 3, wherein each rib is positioned proximate the free end and has a generally semi-circular cross-section.

5. The nut of claim 4, further comprising an internally threaded adjusting collar and a plurality of external threads formed on at least one of the plurality of flexible fingers and the base, the adjusting collar axially movable along the external threads to adjust the axial loading of the coil spring on the adjustment collar to adjust the radial loading of the adjustment collar on the ribs.

6. A nut rectilinear movement along a lead screw, the nut comprising:
   a base;
   a flexible finger extending axially from a portion of the base between a fixed end joined to the base and a free end;
   an adjustment mechanism for radially flexing the flexible finger, the adjustment mechanism including:
      a spring finger corresponding to the flexible finger extending axially between a mounting end and a biasing end, the mounting end fixed proximate the fixed end of the flexible finger and the biasing end abutting the flexible finger proximate the free end, a radial gap being formed between the flexible finger and the spring finger, at least when the spring finger is in a relaxed state;

an adjustment member radially inwardly biasing the spring finger against the corresponding flexible finger such that the spring finger provides a radial biasing load to the corresponding flexible finger.

7. The nut of claim 6, further including:
a plurality of flexible fingers extending axially between a fixed end joined to the base and a free end;
wherein the adjustment mechanism includes a plurality of spring fingers, one spring finger corresponding to each flexible finger, each spring finger extending axially between a mounting end and a biasing end, the mounting end fixed proximate the fixed end of the corresponding flexible finger and the biasing end abutting the free end of the corresponding flexible finger, a radial gap being formed between the spring finger and the corresponding flexible finger, at least when the spring finger is in a generally relaxed state; and
wherein the adjustment member radially inwardly biases each spring finger against the corresponding flexible finger such that the spring finger provides a radial biasing load to the corresponding flexible finger.

8. The nut of claim 7, wherein the flexible fingers surround a longitudinal central axis, each spring finger is oriented such that a radially outer surface of each spring finger includes a tapered region that tapers radially outward relative to the central axis when viewed in a direction extending from the mounting end toward the biasing end, a radially inward portion of the tapered region being spaced radially from the central axis a first distance and a radially outer portion of the tapered region being spaced radially from the central axis a second distance greater than the first distance.

9. The nut of claim 8, wherein the biasing member is axially moveable along the central axis relative to the spring fingers between a first position, wherein the biasing member engages the outer surfaces of the spring fingers at a first contact point and a second position wherein the biasing member engages the outer surfaces of the spring fingers at a second contact point, the second contact point being closer to the biasing end than the first contact point, the spring fingers providing a larger radial biasing load when the biasing member is in the second position.

10. The nut of claim 9, further comprising a plurality of external threads formed on at least one of the body and the flexible fingers proximate, and the biasing member is an internally threaded collar that engages the external threads, the biasing member axially positionable between the first and second positions via the external threads such that movement axially towards the second position from the first position increases the radial biasing load of the spring fingers.

11. The nut of claim 10, wherein each flexible finger includes a radially outward projecting rib and the corresponding spring finger of each flexible finger includes a channel extending transverse to the central axis proximate the biasing end, the rib being received in the channel.

12. The nut of claim 11, further comprising a catch for each spring finger, each catch formed on one of the flexible finger or the body, the catch engaging the mounting end of the corresponding spring finger and axially locating the spring finger.

13. The nut of claim 12, wherein each flexible finger includes an axially extending spring finger alignment groove formed in a radially outer surface, each spring finger being at least partially received in the spring finger alignment groove of the corresponding flexible finger, the spring finger alignment groove preventing angular movement of the received spring finger relative to the corresponding flexible finger.

14. The nut of claim 13, wherein the biasing member has an inner radius that is less than or equal to the second distance and that is greater than or equal to the first distance.

15. The nut of claim 14, wherein the flexible fingers and body are integrally formed of a single piece of plastic and the spring fingers are formed of spring steel.

* * * * *